United States Patent
Kinoshita et al.

(10) Patent No.: US 9,032,891 B2
(45) Date of Patent: May 19, 2015

(54) WATERCRAFT

(71) Applicant: Yamaha Hatsudoki Kabushiki Kaisha, Iwata-shi, Shizuoka (JP)

(72) Inventors: Yoshimasa Kinoshita, Shizuoka (JP); Shu Akuzawa, Shizuoka (JP); Tatsuya Yoshida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 254 days.

(21) Appl. No.: 13/684,770

(22) Filed: Nov. 26, 2012

(65) Prior Publication Data

US 2013/0255560 A1 Oct. 3, 2013

(30) Foreign Application Priority Data

Apr. 2, 2012 (JP) ................. 2012-084263

(51) Int. Cl.
| | |
|---|---|
| *B63B 17/00* | (2006.01) |
| *B63B 35/73* | (2006.01) |
| *B63B 49/00* | (2006.01) |
| *H04B 1/38* | (2006.01) |
| *B63J 3/04* | (2006.01) |
| *B63J 3/00* | (2006.01) |
| *H04M 1/60* | (2006.01) |

(52) U.S. Cl.
CPC ............. *B63B 17/00* (2013.01); *B63B 2203/02* (2013.01); *B63B 49/00* (2013.01); *B63J 3/04* (2013.01); *B63B 2017/0054* (2013.01); *B63B 2203/00* (2013.01); *B63J 2003/002* (2013.01); *H04M 1/6091* (2013.01); *H04B 1/3888* (2013.01); *H04B 2001/3894* (2013.01)

(58) Field of Classification Search
CPC B63B 17/00; B63B 2017/0054; B63B 35/73; B63B 35/731; B63B 2203/00; B63B 2203/02; B63B 49/00; B63J 3/04; B63J 2003/002; H04B 1/3888; H04B 2001/3894; H04M 1/6091; H04M 1/725
USPC ................ 114/55.15, 55.51, 55.53, 343, 364, 114/55.5; 440/2
See application file for complete search history.

(56) References Cited

U.S. PATENT DOCUMENTS

| | | | | |
|---|---|---|---|---|
| 4,706,810 | A | * | 11/1987 | Petrilli ......................... 206/320 |
| 7,131,876 | B2 | * | 11/2006 | Hattori et al. ..................... 440/1 |
| 8,311,546 | B2 | * | 11/2012 | Boudreau et al. ............. 455/445 |
| 8,720,355 | B2 | * | 5/2014 | Aoyama .................... 114/55.53 |

(Continued)

FOREIGN PATENT DOCUMENTS

| | | |
|---|---|---|
| JP | 10-264886 A | 10/1998 |
| JP | 2003-110714 A | 4/2003 |

OTHER PUBLICATIONS

Aoyama, "Water Jet Propulsion Boat," U.S. Appl. No. 13/305,830, filed Nov. 29, 2011.

*Primary Examiner* — Ajay Vasudeva
(74) *Attorney, Agent, or Firm* — Keating & Bennett, LLP

(57) ABSTRACT

A watercraft includes a watercraft body, a watercraft propulsion device, a water protective case, a communication device, and a display device. The watercraft propulsion device propels the watercraft body. The water protective case is arranged on the watercraft body. The communication device communicates with a mobile terminal arranged inside the water protective case. The display device displays content of the mobile terminal based on data received from the mobile terminal through the communication device.

15 Claims, 17 Drawing Sheets

(56) References Cited

U.S. PATENT DOCUMENTS

| | | | |
|---|---|---|---|
| 8,751,158 B2 * | 6/2014 | Kamio et al. | 701/444 |
| 2001/0000052 A1 | 3/2001 | Yamada et al. | |
| 2003/0061076 A1 | 3/2003 | Okuyama et al. | |
| 2007/0171315 A1 * | 7/2007 | Aoyama | 348/836 |
| 2011/0128446 A1 * | 6/2011 | Woo | 348/552 |

* cited by examiner

WATERCRAFT

BACKGROUND OF THE INVENTION

1. Field of the Invention

The present invention relates to a watercraft.

2. Description of the Related Art

In recent years, mobile terminals are sometimes used in watercrafts. For example, Laid-open Japanese Patent Application No. 2003-110714 discloses a watercraft that has an onboard computer connected to a mobile telephone. The onboard computer transfers data to a remote server through a mobile telephone.

Some watercrafts have a storage container. For example, Laid-open Japanese Patent Application No. 10-264886 discloses a watercraft having a plurality of storage containers. The storage container has an opening that communicates with an internal space. The opening is opened and closed by a lid member.

When a mobile terminal is used on a watercraft, it is necessary to protect the mobile terminal from exposure to water. However, with Laid-open Japanese Patent Application No. 2003-110714, there is a possibility that the mobile telephone will become wet because the mobile telephone is placed on a deck of a helm seat. In order to protect the mobile terminal from water, it is feasible to store the mobile terminal in a storage container like that disclosed in Laid-open Japanese Patent Application No. 10-264886. However, when the mobile terminal is stored in a storage container, a crewperson cannot use the mobile terminal. For example, if the mobile terminal functions as a telephone, a person onboard will not notice the ringtone if the mobile terminal receives a call while the mobile terminal is inside the storage container. Also, in order to check for received calls, a crewperson must retrieve the mobile telephone from the storage container. If the mobile terminal is capable of running an application, then the crewperson must retrieve the mobile telephone from the storage container in order to use the application. Consequently, there will be a possibility of the mobile terminal becoming wet whenever it is used on board the watercraft.

SUMMARY OF THE INVENTION

Preferred embodiments of the present invention provide a watercraft in which a mobile terminal on board the watercraft can be prevented from becoming wet and the mobile terminal can be used or charged easily.

A watercraft according to a first preferred embodiment of the present invention includes a watercraft body, a watercraft propulsion device, a water protective case, a communication device, and a display device. The watercraft propulsion device propels the watercraft body. The water protective case is arranged on the watercraft body. The communication device communicates with a mobile terminal arranged inside the water protective case. The display device displays content of the mobile terminal based on data received from the mobile terminal through the communication device.

A watercraft according to a second preferred embodiment of the present invention includes a watercraft body, a watercraft propulsion device, a battery, a water protective case, and a charging device. The watercraft propulsion device propels the watercraft body. The battery is arranged in the watercraft body. The water protective case is arranged on the watercraft body. The charging device is connected to the battery and charges a mobile terminal arranged inside the water protective case using wireless energy.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
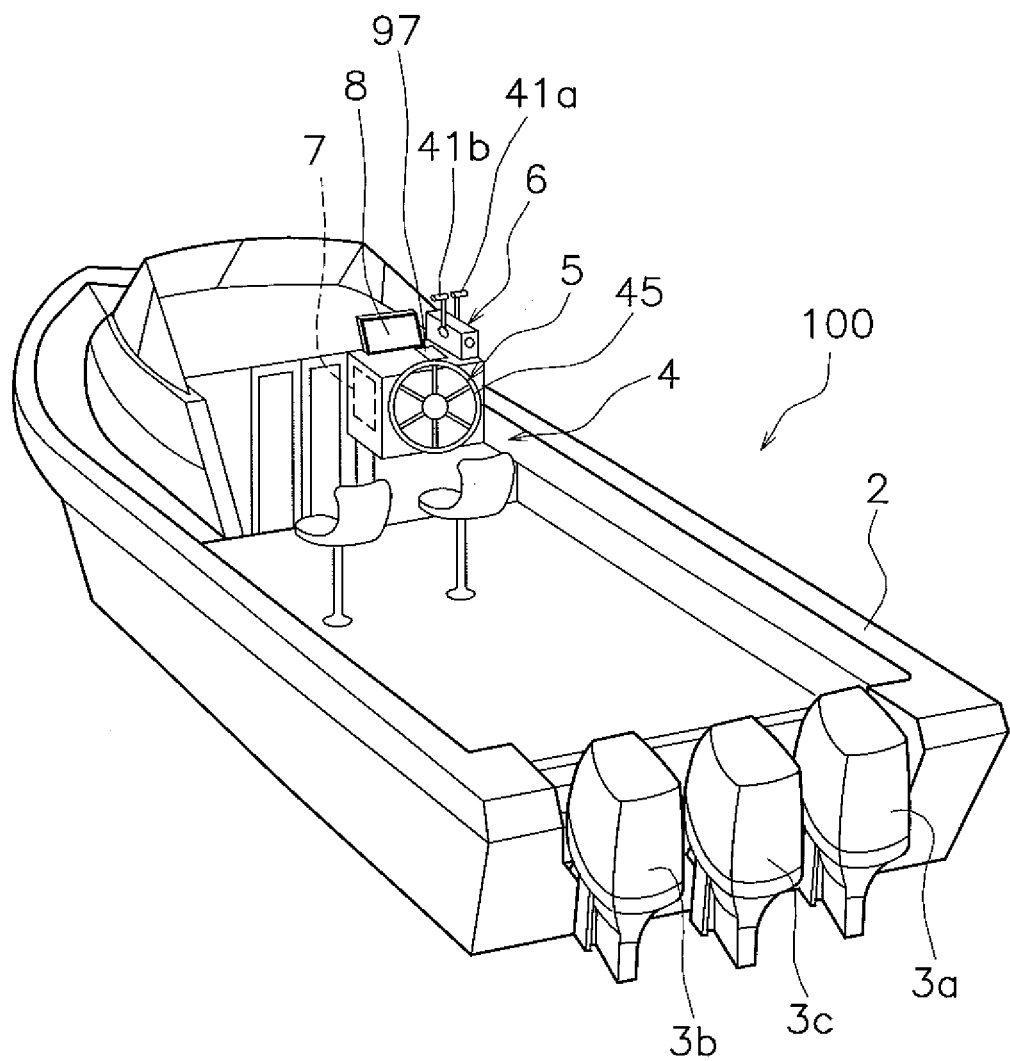
FIG. 1 is a perspective view of a watercraft according to a first preferred embodiment of the present invention.

Preferred embodiments of the present invention will now be explained with reference to the drawings. FIG. 1 is a perspective view of a watercraft 100 according to a first preferred embodiment of the present invention. The watercraft 100 includes a watercraft body 2 and a plurality of watercraft propulsion devices 3a to 3c, for example. In the present preferred embodiment, the watercraft 100 preferably includes three watercraft propulsion devices (hereinafter called "first watercraft propulsion device," "second watercraft propulsion device," and "third watercraft propulsion device"), for example. The first watercraft propulsion device 3a, the second watercraft propulsion device 3b, and the third watercraft propulsion device 3c are so-called outboard motors mounted to the stern of the watercraft body 2. The first watercraft propulsion device 3a, the second watercraft propulsion device 3b, and the third watercraft propulsion device 3c are arranged side-by-side along a widthwise direction of the watercraft body 2. More specifically, the first watercraft propulsion device 3a is arranged on a starboard side of the stern. The second watercraft propulsion device 3b is arranged on the port side of the stern. The third watercraft propulsion device 3c is arranged in the middle of the stern between the first watercraft propulsion device 3a and the second watercraft propulsion device 3b. The first watercraft propulsion device 3a, the watercraft propulsion device 3b, and the watercraft propulsion device 3c generate propulsion forces that propel the watercraft 100. The watercraft body 2 includes a helm seat 4. A steering device 5, a remote control device 6, a central controller 7, and a display device 8 are arranged at the helm seat 4. The steering device 5 is used by a crewperson to control a turning direction of the watercraft 100. The remote control device 6 is used by a crewperson to adjust a speed of the watercraft. The remote control device 6 is also used to switch between forward propulsion and reverse propulsion of the watercraft 100. The central controller 7 executes centralized control of a plurality of devices installed on the watercraft 100. The display device 8 is arranged frontward of the helm seat 4 or in another position easily viewed from the helm seat 4. The display device 8 communicates with the central controller 7 and displays information related to the watercraft 100. The steering device 5, the remote control device 6, the central control device 7, and the display device 8 will be explained in more detail below.

Figure 2:
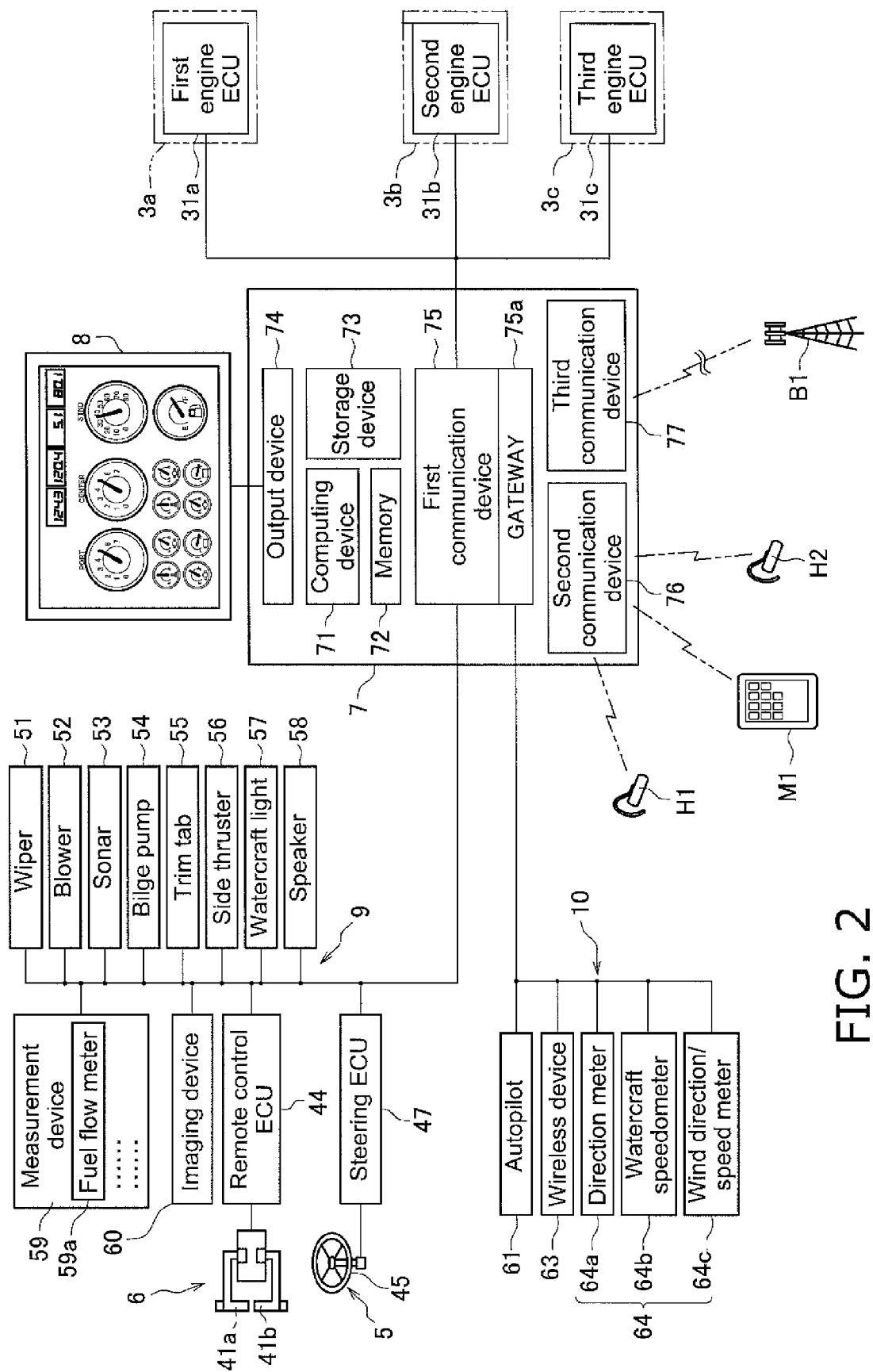
FIG. 2 is a block diagram showing constituent features of a device network system of the watercraft.

FIG. 2 is a block diagram showing constituent features of a device network system installed on the watercraft 100. The device network system includes the first watercraft propulsion device 3a, the second watercraft propulsion device 3b, the third watercraft propulsion device 3c, the steering device 5, the remote control device 6, the central controller 7, and the display device 8. The device network system of the watercraft 100 includes a first additional function system 9 and a second additional function system 10.

The first watercraft propulsion device 3a includes a first engine ECU (electronic control unit) 31a. The first engine ECU 31a stores a control program for the first watercraft propulsion device 3a. The first engine ECU 31a controls the operation of the first watercraft propulsion device 3a based on signals from the steering device 5 and the remote control device 6 and based on information detected by various sensors (not shown in the drawings) installed on the first watercraft propulsion device 3a. The first engine ECU 31a is connected to the central controller 7 through a communication line. For example, the first engine ECU 31a might communicate with the central controller 7 using a CAN (controller area network) protocol. The second watercraft propulsion device 3b includes a second engine ECU 31b. The second engine ECU 31b controls operation of the second watercraft propulsion device 3b. The third watercraft propulsion device 3c includes a third engine ECU 31c. The third engine ECU 31c controls operation of the third watercraft propulsion device 3c.

The remote control device 6 includes a first operating member 41a, a second operating member 41b, and a remote control ECU 44. The first operating member 41a and the second operating member 41b are, for example, levers. By operating the first operating member 41a, a crewperson can change the rotational direction of a propeller of the first watercraft propulsion device 3a between a forward direction and a reverse direction. Also, a target engine rotational speed of the first watercraft propulsion device 3a is set to a value corresponding to the operating position of the first operating member 41a. By operating the second operating member 41b, a crewperson can change the rotational direction of a propeller of the second watercraft propulsion device 3b between a forward direction and a reverse direction. Also, a target engine rotational speed of the second watercraft propulsion device 3b is set to a value corresponding to the operating position of the second operating member 41b. A change between forward and reverse operation of the watercraft propulsion device 3c and a target engine rotational speed of the third watercraft propulsion device 3c are determined based on the combination of the operation of the first operating member 41a and the second operating member 41b.

The remote control ECU 44 is connected to the central controller 7 through a communication line. The remote control ECU 44 communicates with the central controller 7 using, for example, an analog signal. The remote control ECU 44 transmits a signal indicating the shift positions of the first operating member 41a and the second operating member 41b to the central controller 7.

The steering device 5 includes a steering operating member 45 and a steering ECU 47. The steering operating member 45 is, for example, a steering wheel. A crewperson can adjust an advancing direction of the watercraft 100 by operating the steering member 45. The steering ECU 47 is connected to the central controller 7 through a communication line. The steering ECU 47 communicates with the central controller 7 using, for example, an analog signal. The steering ECU 47 transmits a signal indicating the position of the steering operating member 45 to the central controller 7.

The first additional function system 9 includes, for example, a wiper 51, a blower 52, a sonar 53, a bilge pump 54, a trim tab 55, a side thruster 56, a watercraft light 57, a speaker 58, and various measurement devices 59, such as a fuel flow meter 59a. The wiper 51 is attached to a front windshield in front of the driver's seat. The blower 52 serves to ventilate the interior of an engine room. Although a blower 52 is preferably provided for each of the first to third watercraft propulsion devices 3a to 3c, in FIG. 3 only one blower 52 is shown and the other blowers are omitted from FIG. 3. The sonar 53 emits sound waves into the water surrounding the watercraft body 2 and measures the positions of objects in the water. The bilge pump 54 serves to pump water accumulated in a bottom of the watercraft to the exterior of the watercraft. The trim tab 55 serves to suppress shaking of the watercraft body 2 in the leftward and rightward directions caused by rotation of the propellers. The trim tab 55 includes a fin (not shown in the drawings) and a drive device that changes the direction of the fin. Although a trim tab 55 is preferably provided for each of the first to third watercraft propulsion devices 3a to 3c, in FIG. 3 only one trim tab 55 is shown and the other trim tabs are omitted. The side thruster 56 generates a propulsion force to move the watercraft body 2 in a lateral direction. The watercraft light 57 includes, for example, a mast light, a stern light, an anchor light, and a navigation light. The speaker 58 is arranged inside the watercraft and serves to emit sound. These devices of the first additional function system 9 are preferably connected to the central controller 7 through a communication line, for example. Devices of the first additional function system 9 are, for example, provided by the manufacturer of the first to third watercraft propulsion devices 3a to 3c. The devices of the first additional function system 9 preferably communicate with the central controller 7 using the same communication interface as is used for communication between the central controller 7 and the first to third engine ECUs. The devices of the first additional function system 9 communicate with the central controller 7 using, for example, CAN protocol. It is also acceptable for the devices of the first additional function system 9 to communicate with the central controller 7 using analog signals. Also, the first additional function system 9 preferably includes an imaging device 60. The imaging device 60 is, for example, a camera. The imaging device 60 captures an image and generates electronic data expressing the image. The word "image" is used here to mean a photograph or other kind of stationary image. The imaging device 60 also captures a moving image and generates electronic data expressing the moving image. It is also acceptable for the first additional function system 9 to include other devices in addition to those already mentioned, e.g., a horn, interior lighting of the watercraft, or a live well pump for changing water in a live well provided on the watercraft.

The second additional function system 10 includes, for example, an autopilot device 61, a wireless device 63 (two-way radio), and a variety of measurement devices 64. The autopilot device 61 is a device for holding a set course. If the course deviates from the set direction, the autopilot device 61 transmits a command signal to the central controller 7 to revise the course of the watercraft 100. The central controller 7 controls steering angles of the first to third watercraft propulsion devices 3a to 3c based on the command signal from the autopilot device 61. In this way, the course of the watercraft 1 is automatically revised.

The wireless device 63 is, for example, an international VHF wireless (marine VHF radio) device that communicates voices using radio waves in a prescribed frequency band. The measurement devices 64 include a direction meter 64a, a watercraft speedometer 64b, and a wind speed/wind direction meter 64c. These devices of the second additional function system 10 are preferably connected to the central controller 7 through a communication line, for example. The devices of the second additional function system 10 are, for example, third party devices that are not made by the same manufacturer as the first to third watercraft propulsion devices 3a to 3c. Thus, the devices of the second additional function system 10 do not necessarily communicate with the central controller 7 using the same communication interface as is used for communication between the central controller 7 and the first to third engine ECUs 31a. Thus, the devices of the second additional function system 10 may communicate with the central controller 7 using a different communication interface from the communication interface between the central controller 7 and the first to third engine ECUs 31a to 31c. The devices of the second additional function system 10 communicate with the central controller 7 using, for example, a NMEA (National Marine Electronics Association) protocol. It is also acceptable for the devices of the second additional function system 10 to communicate with the central controller 7 using the CAN protocol in the same manner as the devices of the first additional function system 9.

The central controller 7 makes up a portion of a device network system of the watercraft 100 that also includes a plurality of devices installed on the watercraft 100. The central controller 7 functions as a network host having a central role in the device network system. The central controller 7 includes, for example, a CPU or other computing device 71, a memory 72, a storage device 73, an output device 74, a first communication device 75, a second communication device 76, and a third communication device 77. The storage device 73 is, for example, a hard disk or a flash memory. It is acceptable for the storage section 73 to be an SD card, a USB memory, or another external storage medium. The output device 74 sends an image signal to the display device 8. If the display device 8 includes a built-in speaker, then it is acceptable for the output device 74 to send a voice signal to the display device 8 along with the image signal.

The first communication device 75 serves to conduct communications among the first watercraft propulsion device 3a, the second watercraft propulsion device 3b, the third watercraft propulsion device 3c, the steering device 5, the remote control device 6, the devices of the first additional function system 9, and the devices of the second additional function system 10. The first communication device 75 includes a plurality of ports not shown in the drawings. The plurality of ports are connected to communication lines from the first to third engine ECUs 31a to 31c, the steering ECU 47, the remote control ECU 44, the devices of the first additional function system 9, and the devices of the second additional function system 10. The first communication device 75 includes a gateway 75a. The devices of the second additional function system 10 are preferably connected to the central controller 7 through the gateway 75a.

The second communication device 76 serves to conduct communication with devices that are external to the device network of the watercraft 100. The second communication device 76 communicates with the external devices using, for example, Bluetooth or a wireless LAN. The external devices are, for example, such mobile terminals M1 as smart phones and tablets. The third communication device 77 is used to connect to the internet, for example. The third communication device 77 conducts communication with a mobile communication base station B1. For example, the third communication device 77 connects to the internet using 3G or 4G mobile communication.

The display device 8 displays information regarding the watercraft 100 using a GUI (graphic user interface) or other display format. The display device 8 displays information regarding the devices connected to the central controller 7. The display device 8 is, for example, a liquid crystal display, an organic EL (electroluminescent) display, or other type of display. The display device preferably also has a touch panel function. A crewperson can change among the screens displayed on the display device 8 using a touch panel function. A crewperson can also operate the devices explained previously using the touch panel function. The display device 8 displays, for example, the engine rotational speeds of the first to third watercraft propulsion devices 3a to 3c, a fuel gauge, and other information related to the watercraft 100.

Figure 3:
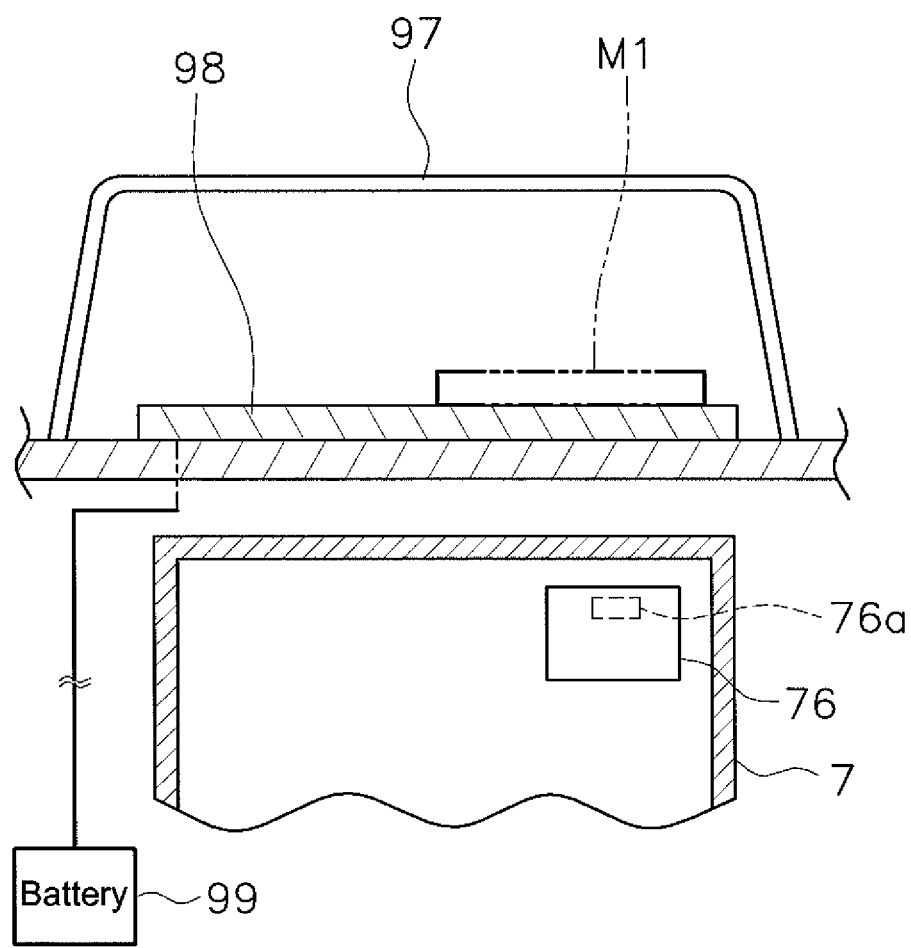
FIG. 3 is a cross sectional diagram of a water protective case.

As shown in FIG. 3, the watercraft 100 is provided with a water protective case 97. The mobile terminal M1 is stored inside the water protective case 97. The water protective case 97 is arranged in a location peripheral to the helm seat 4. The water protective case 97 is preferably arranged where it can be reached from the driver's seat. It is also acceptable to arrange the water protective case where it can be reached from a passenger's seat. The second communication device 76 is arranged in a position where it can communicate in a stable manner with the mobile terminal M1 stored in the water protective case 97. More specifically, the second communication device 76 includes a wireless communication antenna 76a and the antenna 76a is arranged in a position where it can communicate with the mobile terminal M1 inside the water protective case 97. The second communication is arranged, for example, below the water protective case 97. The communication between the central controller 7 and mobile terminal inside the water protective case 97 is not limited to wireless communication and it is acceptable to communicate through a wired connection. For example, it is acceptable for the central controller 7 and the mobile terminal M1 to be connected through a USB or other wired communication interface.

A charging device 98 is arranged between the mobile terminal M1 and the second communication device 76. The charging device 98 has a wireless charging function. That is, the charging device 98 is a non-contact type charger that can charge the mobile terminal M1 using wireless power transmission when the mobile terminal M1 is merely arranged above the charging device 98. The charging device 98 is connected to a battery 99 through an electric power line. The battery 99 is arranged on the watercraft body 2.

The water protective case 97 is preferably made of a transparent material. As a result, the mobile terminal M1 inside the water protective case 97 can be checked from the outside. It is acceptable for the water protective case to be arranged using an existing small storage compartment arranged on the watercraft 100. It is also acceptable for the water protective case 97 to be arranged to be detachable from the watercraft 100. Furthermore, it is acceptable for the second communication device 76 to be a wired communication device including a connecting portion that extends into the interior of the water protective case 97 and connects to the mobile terminal M1. It is also acceptable for the charging device 98 to be a wired charging device including a connecting portion that extends into the interior of the water protective case 97 and connects to the mobile terminal M1.

Mobile terminal operating functions provided by a watercraft according to preferred embodiments of the present invention will now be explained. As explained previously, the central controller 7 can communicate with the mobile terminal M1 inside the water protective case 97 through the second communication device 76. The central controller 7 communicates with the mobile terminal M1 and thereby acquires screen data displayed on a display of the mobile terminal M1. The central controller 7 then displays the same screen as is displayed on the display of the mobile terminal M1 on the display device 8 based on the acquired screen data. Thus, the display device 8 can display a screen of an application opened on the mobile terminal M1. The central controller 7 also transmits a command signal generated by touch operation of the display device 8 to the mobile terminal M1 through the second communication device 76. The terminal M1 executes control of the application based on the command signal from the central controller 7. In this way, a crewperson can operate the application of the mobile terminal M1 by executing touch operations on the display device 8.

Figure 4:
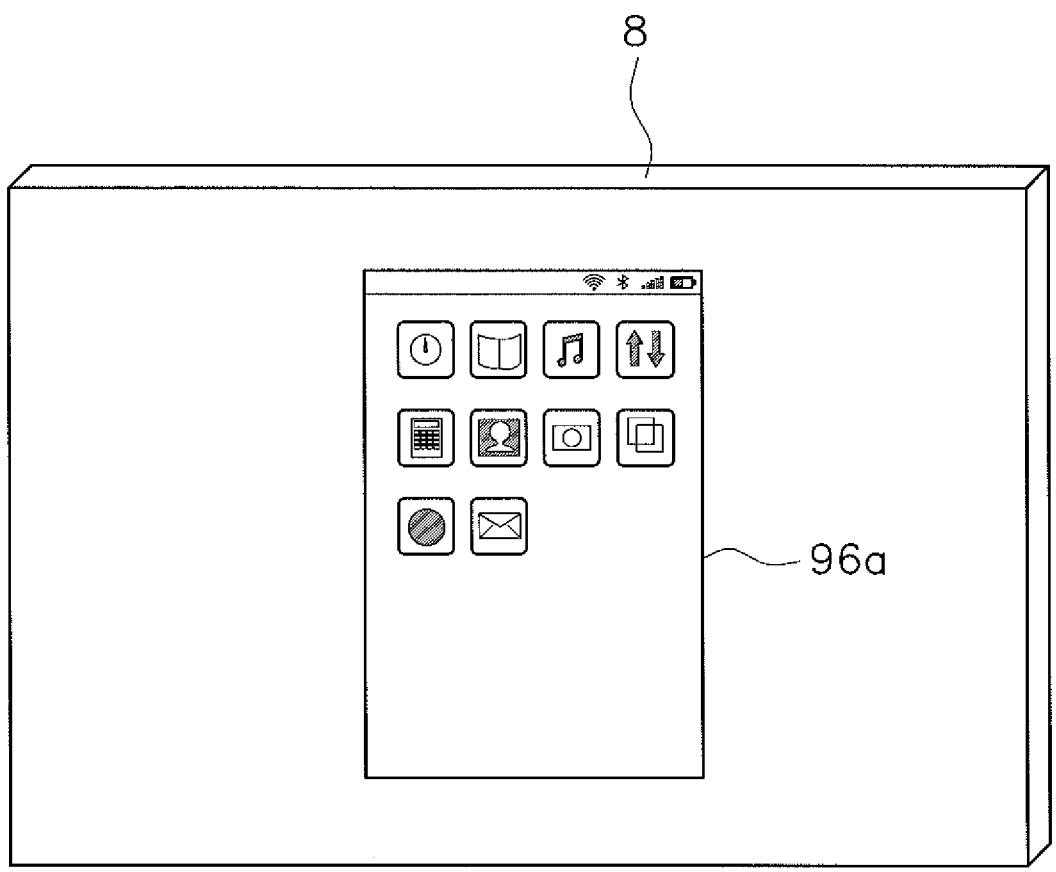
FIG. 4 is an example of a screen of a mobile terminal displayed on a display device.
Figure 5:
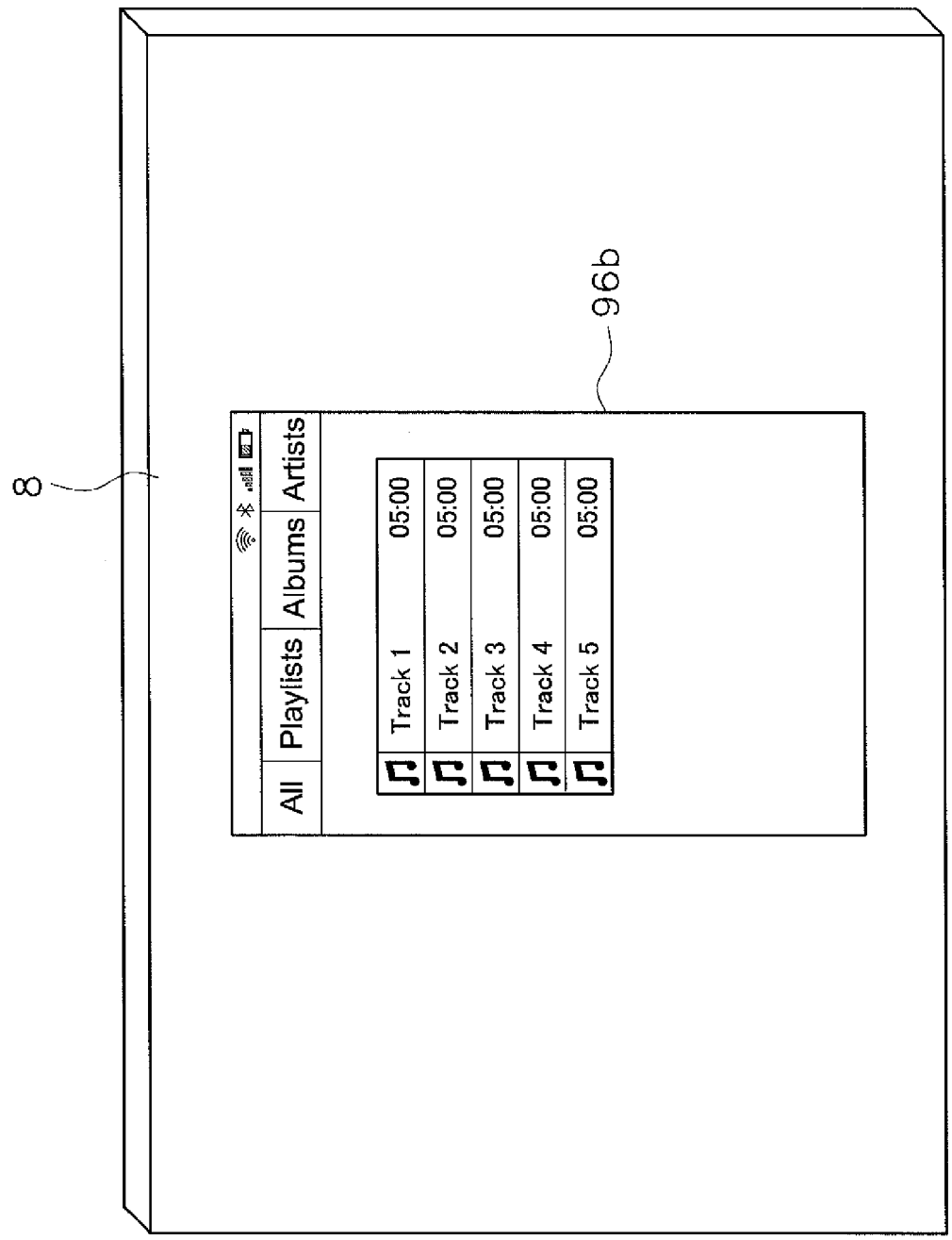
FIG. 5 is another example of a screen of a mobile terminal displayed on a display device.

FIG. 4 shows an example of a screen displayed on the display device 8. As shown in FIG. 4, the display device 8 shows an application list screen 96a that is the same as the screen displayed on the display of the mobile terminal M1. A crewperson can open a desired application by tapping the icon of the application displayed on the display device 8. For example, FIG. 5 shows an operating screen 96b that is displayed when a music player application is opened. The display device 8 shows a playlist screen that is the same as the display of the mobile terminal M1. A crewperson can select a desired music track by tapping the song name in the list displayed on the display device 8. When a crewperson selects a song by touching the display device 8, the central controller 7 transmits a command signal to the mobile terminal M1. As a result, the mobile terminal M1 plays back the selected song. It is also acceptable for the mobile terminal M1 to transmit music data for the selected song to the central controller 7 such that the music is played through the speaker 58 of the watercraft 100. The display device 8 can also display images and videos stored on the mobile terminal M1 and is not limited to playing back music.

If the mobile terminal M1 includes a telephone function, then the display device 8 displays information indicating a call that is received when the mobile terminal M1 receives a call. The information indicating the call is, for example, a message or an image indicating a call was received. If the mobile terminal M1 includes a GPS or another GNSS (global navigation satellite system) receiver, then the display device 8 will display a current position of the mobile terminal M1 detected by the GNSS receiver.

The central controller 7 also communicates with external hands free phones H1 and H2 (see FIG. 2) through the second communication device 76. The hands free phones H1 and H2 each include a microphone and an earphone. The central controller 7 relays voice data between the hands free phones H1 and H2. Thus, using the hands free phones, crewpersons aboard the watercraft can converse comfortably with each other while the watercraft is moving even in the presence of wind and engine noise. It is also acceptable to use the hands free phones H1 and H2 to talk through the mobile terminal M1 inside the water protective case 97.

Since, as explained previously, the central controller 7 can communicate with the mobile terminal M1, in the watercraft 100 according to the present preferred embodiment the mobile terminal M1 can easily connect to the network of the watercraft 100. As a result, the functions of the mobile terminal M1 can be used readily aboard the watercraft 100. While it would not be easy to operate the mobile terminal M1 aboard the watercraft 100 when the watercraft 100 is rocking severely and the mobile terminal M1 is likely to get wet, with this preferred embodiment the display device 8 can be used to operate the mobile terminal M1 while the mobile terminal M1 remains inside the water protective case 98.

Figure 6:
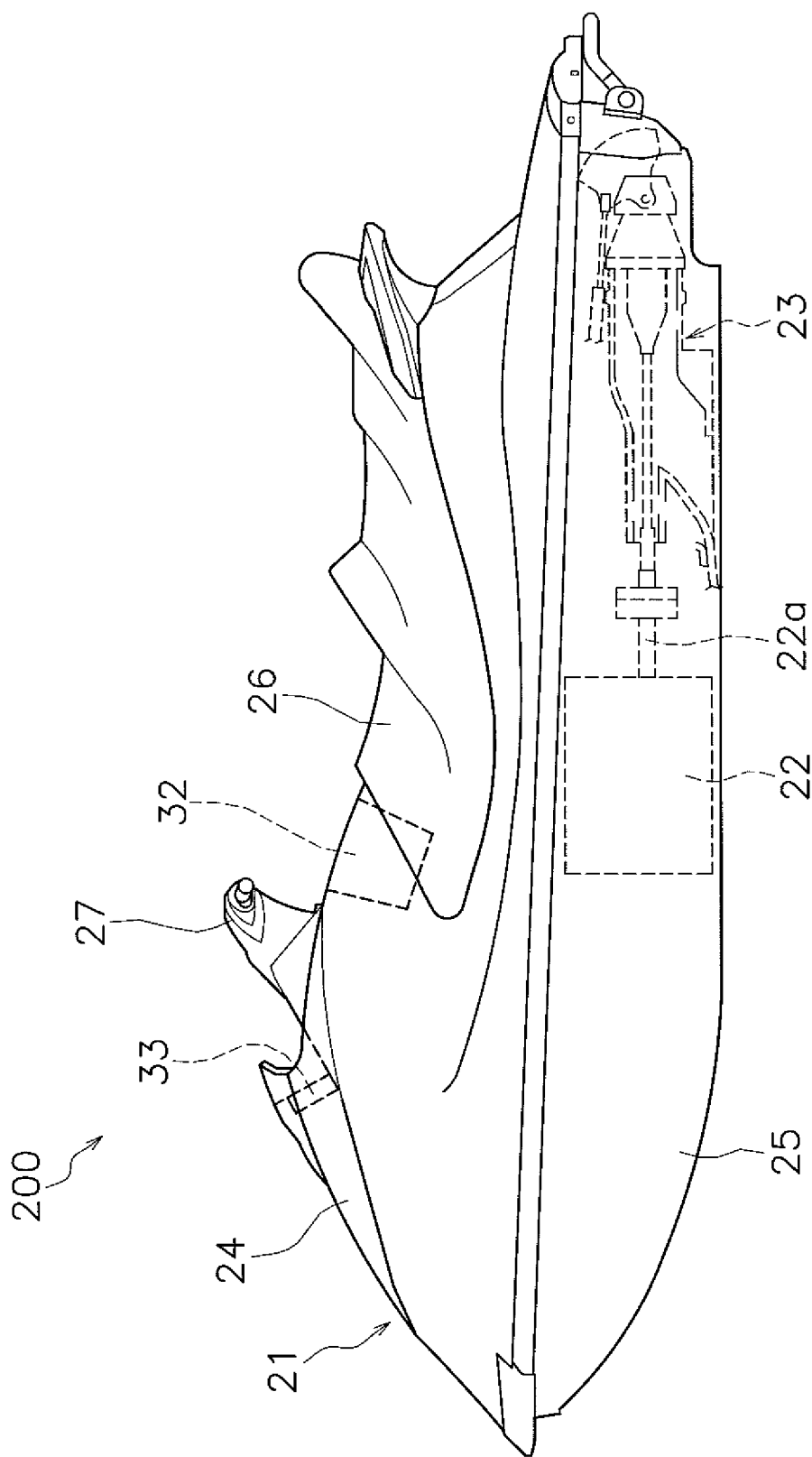
FIG. 6 is a side view of a watercraft according to a second preferred embodiment of the present invention.

A watercraft 200 according to a second preferred embodiment of the present invention will now be explained. FIG. 6 is a side view of the watercraft 200 according to the second preferred embodiment. The watercraft 200 is a so-called personal watercraft (PWC). The watercraft 200 includes a watercraft body 21, an engine 22, and a watercraft propulsion device 23.

As shown in FIG. 6, the watercraft body 21 includes a deck 24 and a hull 25. A straddle-type seat 26 is attached to the deck 24. The seat 26 is arranged above the engine 22. A steering handlebar 27 for steering the watercraft body 21 is arranged on the deck 24. The seat 26 is preferably arranged rearward of the steering handlebar 27. The engine 22 is arranged inside the watercraft body 21. The engine 22 includes a crankshaft 22a. The crankshaft 22a is arranged to extend in a longitudinal direction of the watercraft 200. The watercraft propulsion device 23 is a so-called water jet propulsion device. The watercraft propulsion device 23 is connected to the crankshaft 22a. The watercraft propulsion device 23 is driven by the engine 22 and serves to draw in water from around the watercraft body 21 and shoot the water out.

Figure 7:
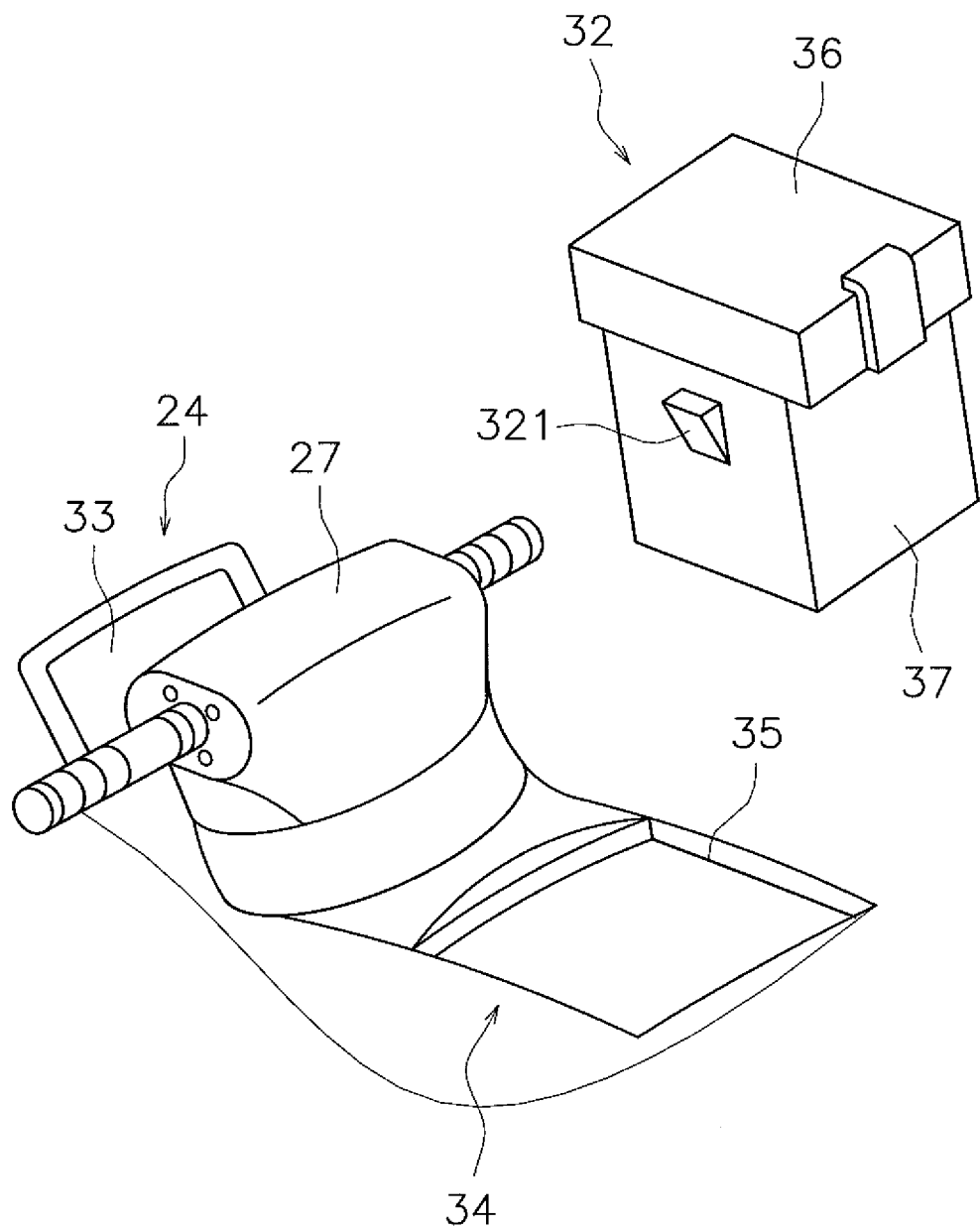
FIG. 7 is a perspective view of a portion of a deck.

The watercraft 200 includes a water protective case 32 and a display unit 33. The water protective case 32 is attached to the deck 24. The water protective case 32 is arranged between the steering handlebar 27 and the seat 26. The display unit 33 is arranged frontward of the steering handlebar 27. FIG. 7 is a perspective view of a portion of the deck 24. As shown in FIG. 7, the deck includes a mounting section 34 where the water protective case 32 is detachably mounted. The mounting section 34 is arranged between the steering handlebar 27 and the seat 26. The mounting section 34 includes an opening 35. The water protective case 32 is arranged inside the opening 35.

Figure 8:
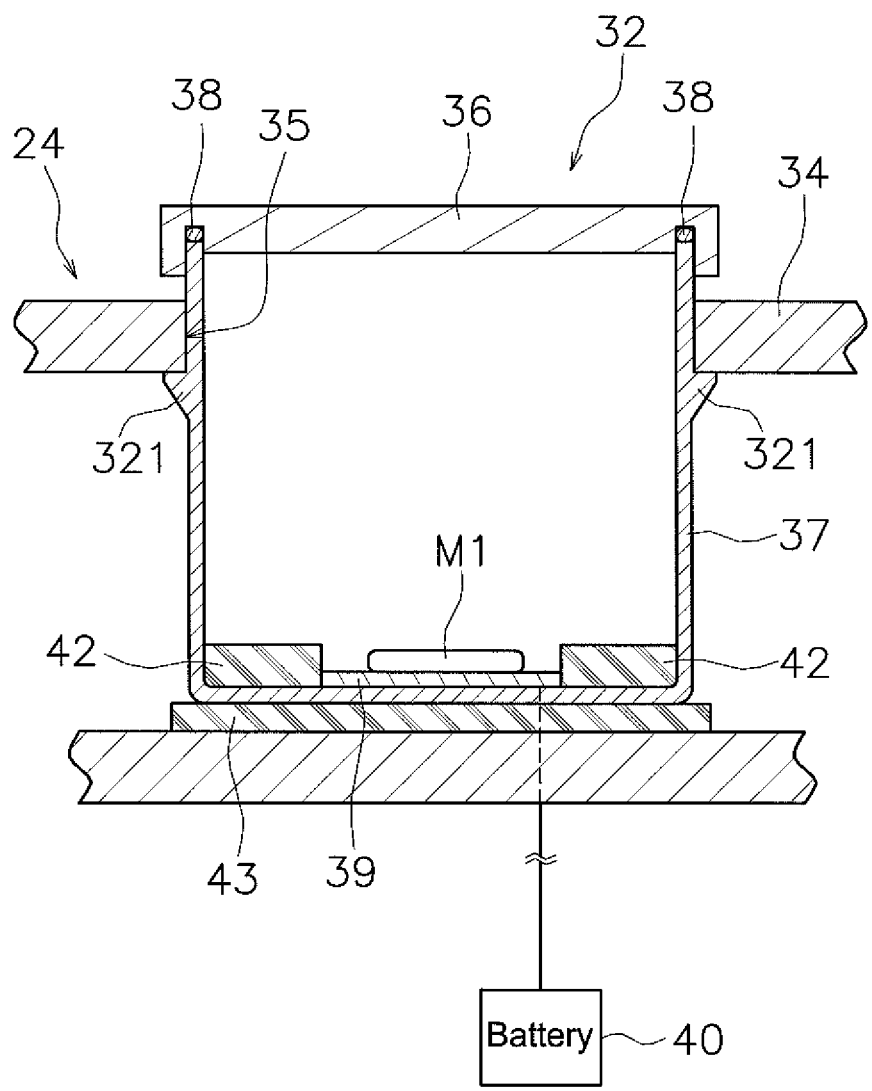
FIG. 8 is a cross sectional view of a water protective case.

FIG. 8 is a cross sectional view of the water protective case 32 and the mounting section 34. The water protective case 32 includes a lid 36 and a case main body 37. The lid 36 is detachably attached to the case main body 37. A seal member 38 is attached to the lid 36 and the lid 36 closes the case main body 37 in a watertight manner. The case main body 37 is preferably made of resin or another material having an elastic quality. The water protective case 32 has a mounting structure such that the water protective case 32 can be mounted to and removed from the mounting section 32 without using a tool. More specifically, the water protective case 32 includes a plurality of protrusions 321. The protrusions 321 are provided on a side surface of the case main body 37. The protrusions 321 secure the case main body 37 to the mounting section 34 by catching onto the rim of the opening 35 of the mounting section 34. When the case main body 37 is to be removed from the mounting section 34, the protrusions 321 are pressed from outside the case main body 37 such that the case main body 37 undergoes elastic deformation. As a result, the protrusions 321 release from the rim of the opening 35 and the case main body 37 separates from the mounting section 34. Thus, the water protective case 32 can be installed into and removed from the mounting section 34 without using a tool. It is preferable for a space underneath the seat 26 to communicate with the storage space of the case main body 37. In such a case, the protrusions 321 of the case main body 37 can be accessed by reaching through an opening provided below the seat 26.

A charging device 39 is arranged inside the water protective case 32. The charging device 39 is connected through an electric power line to a battery 40 arranged in the watercraft body 21. The charging device 39 has a wireless charging function similar to the charging device 98 of the first preferred embodiment. The charging device 39 can charge the mobile terminal M1 using wireless electric power transmission.

The water protective case 32 includes an internal protective pad 42 and an external protective pad 43. The internal protective pad 42 is arranged inside the case main body 37. The external protective pad 43 is attached to an outside surface of the case main body 37. More specifically, the external protective pad 43 is attached to a bottom surface of the case main body 37. It is acceptable for the external protective pad 43 to be attached to a side surface of the case main body 37. The internal protective pad 42 and the external protective pad 43 preferably are each made of an elastic material or a foam material having a vibration absorbing quality. The internal protective pad 42 and the external protective pad 43 serve to damp vibrations and impacts reaching the mobile terminal M1 inside the water protective case 32.

Figure 9:
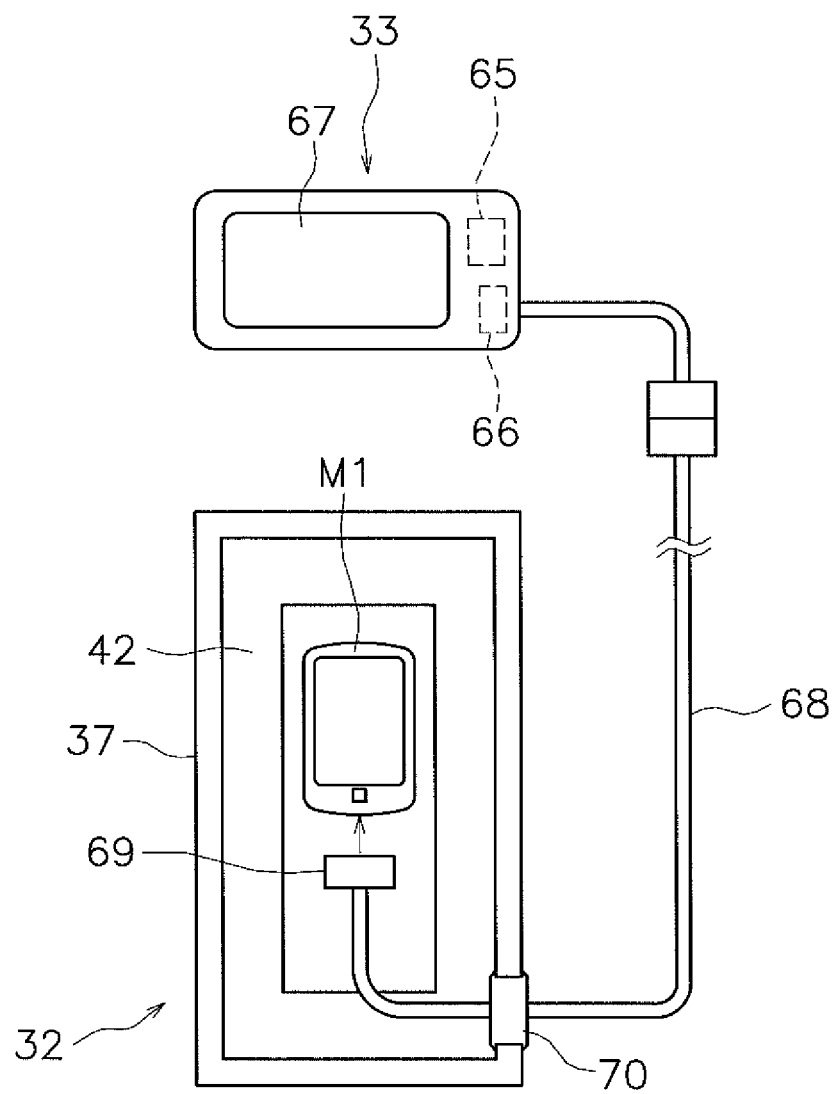
FIG. 9 is a schematic view showing constituent features of the water protective case and a display unit.

FIG. 9 is a schematic view showing constituent features of the water protective case 32 and the display unit 33. The display unit 33 includes a controller 65, a communication device 66, and a display device 67. The controller 65 can communicate with the mobile terminal M1 inside the water protective case 32 through the communication device 66. The communication device 66 is preferably connected to the mobile terminal M1 through a communication cable 68. The communication cable 68 includes a connector 69. The connector 69 is arranged inside the water protective case 32 and connected to the mobile terminal M1. The communication cable 68 preferably extends through the seal member 70 into the case main body 37.

Figure 10:
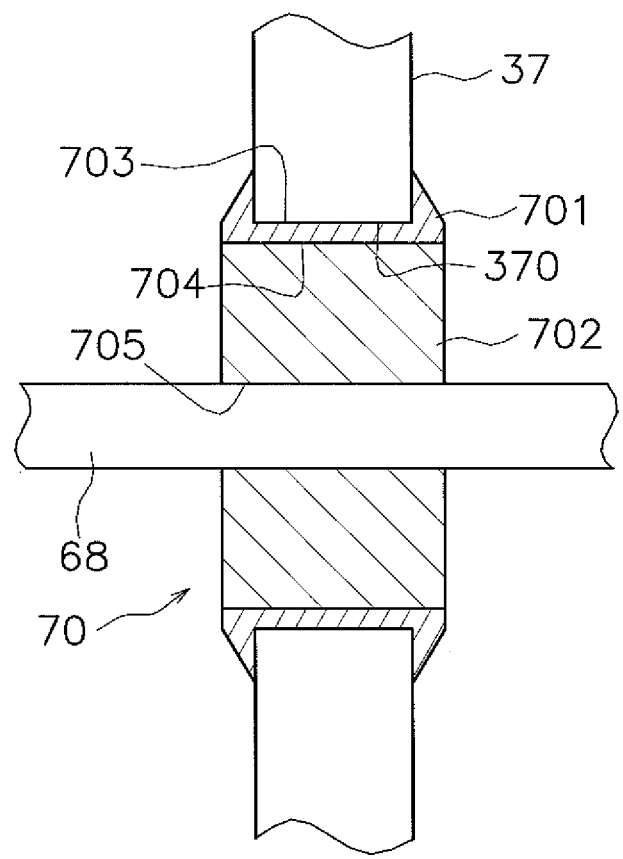
FIG. 10 is a cross sectional view showing a portion of a case main body and a seal member.
Figure 11:
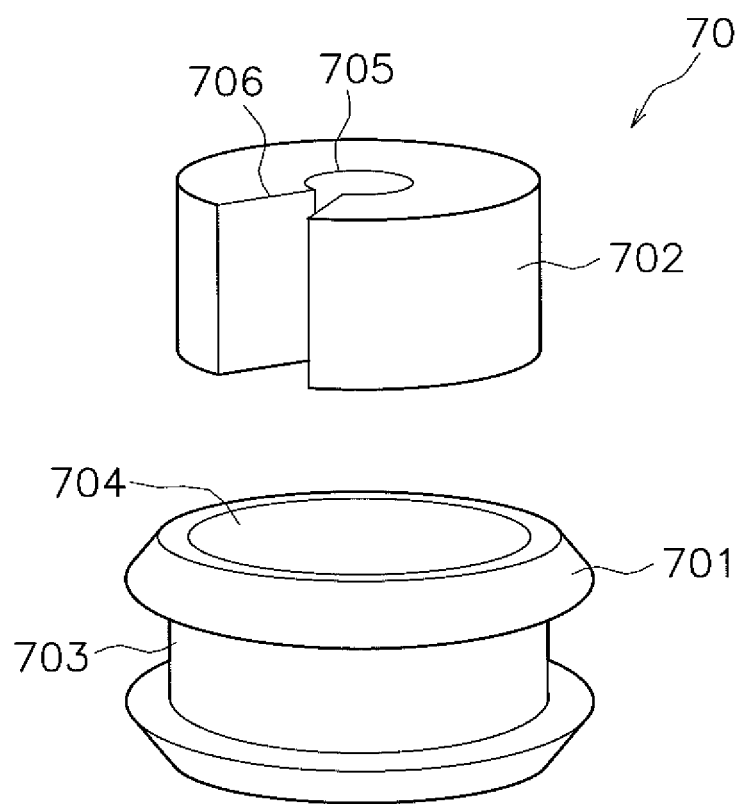
FIG. 11 is an exploded perspective view of the seal member.

FIG. 10 is a cross sectional view of a portion of the case main body 37 and the seal member 70. As shown in FIG. 10, the seal member 70 is fitted into a hole 370 in the case main body 37. The seal member 70 includes an outside member 701 and an inside member 702. The outside member 701 preferably has a substantially cylindrical shape, for example. A recess 703 is provided in a side surface of the outside member 701. The seal member 70 is attached to the case main body 37 by the rim of the hole 370 of case main body 37 fitting into the recess 703. The outside member 701 includes a hole 704. The inside member 702 is inserted into the hole 704 of the outside member 701. The inside member 702 is preferably made of an elastic material, e.g., rubber. FIG. 11 is an exploded perspective view of the seal member 70. As shown in FIG. 11, the inside member 702 includes a hole 705 and a missing-slice section 706. The communication cable 68 is inserted through the hole 705. The missing-slice section 706 joins the hole 705. When the inside member 702 is inserted into the hole 704 of the outside member 701 while the communication cable 68 is arranged inside the hole 705 of the inside member 702, the missing-slice section 706 of the inside member 702 closes.

Similarly to the watercraft 100 of the first preferred embodiment, the watercraft 200 of the second preferred embodiment has functionality for operating a mobile terminal M1. That is, the controller 65 communicates with the mobile terminal M1 and thereby acquires screen data displayed on the display of the mobile terminal M1. The controller 65 then displays the same screen as is displayed on the display of the mobile terminal M1 on the display device 67 based on the acquired screen data. The controller 65 also transmits a command signal generated by touch operation of the display device 67 to the mobile terminal M1 through the communication device 66. The mobile terminal M1 executes control of the application based on the command signal from the controller 65. In this way, a crewperson can operate the application of the mobile terminal M1 by executing a touch operation on the display device 67. The other operational functions of the watercraft 200 of the second preferred embodiment with respect to the mobile terminal M1 are preferably the same as the operational functions of the watercraft 100 of the first preferred embodiment with respect to the mobile terminal M1 and explanations thereof are omitted here.

Although preferred embodiments of the present invention have been explained herein, the present invention is not limited to these preferred embodiments. Various changes can be made without departing from the scope of the present invention.

The watercraft propulsion device is not limited to an outboard motor or a water jet propulsion device and it is acceptable for the watercraft propulsion device to be an inboard/outboard motor or other propulsion device. The watercraft is not limited to a personal watercraft and it is acceptable for the watercraft to be a sports board or other type of watercraft.

It is acceptable if the display device 8 or 67 does not have a touch panel function. That is, it is acceptable for the display devices 8 and 67 to be any type of display device so long as it displays the screen content of the mobile terminal M1.

Although in the first preferred embodiment the watercraft 100 has three watercraft propulsion devices 3a to 3c, the number of watercraft propulsion devices is not limited to three. It is acceptable to equip the watercraft with two or fewer or four or more watercraft propulsion devices.

In the first preferred embodiment, each of the devices is preferably equipped with a controller and the central controller 7 communicates with the controllers of the devices. However, it is also acceptable for the central controller 7 to serve as the controllers of the devices. For example, it is acceptable for the central controller 7 to also function as the remote control ECU 44. It is also acceptable for the central controller 7 to function as the steering ECU 47.

Although in the first preferred embodiment the central controller 7 can connect to the internet through the third communication device 77, it is acceptable if the central controller 7 can connect to the internet through the mobile terminal M1. For example, it is acceptable for the central controller 7 to use a tethering function of the mobile terminal M1 to connect to the internet.

In the second preferred embodiment, the controller 65, the communication device 66, and the display device 67 are provided as a single display unit 33. However, it is acceptable for the controller 65, the communication device 66, and the display device 67 to be provided as separate devices.

In the second preferred embodiment, the mobile terminal M1 and the communication device 66 communicate with each other through a wire connection. However, it is acceptable for the communication device 66 of the second preferred embodiment to communicate wirelessly with the mobile terminal M1 similarly to the second communication device 76 of the first preferred embodiment.

Figure 12:
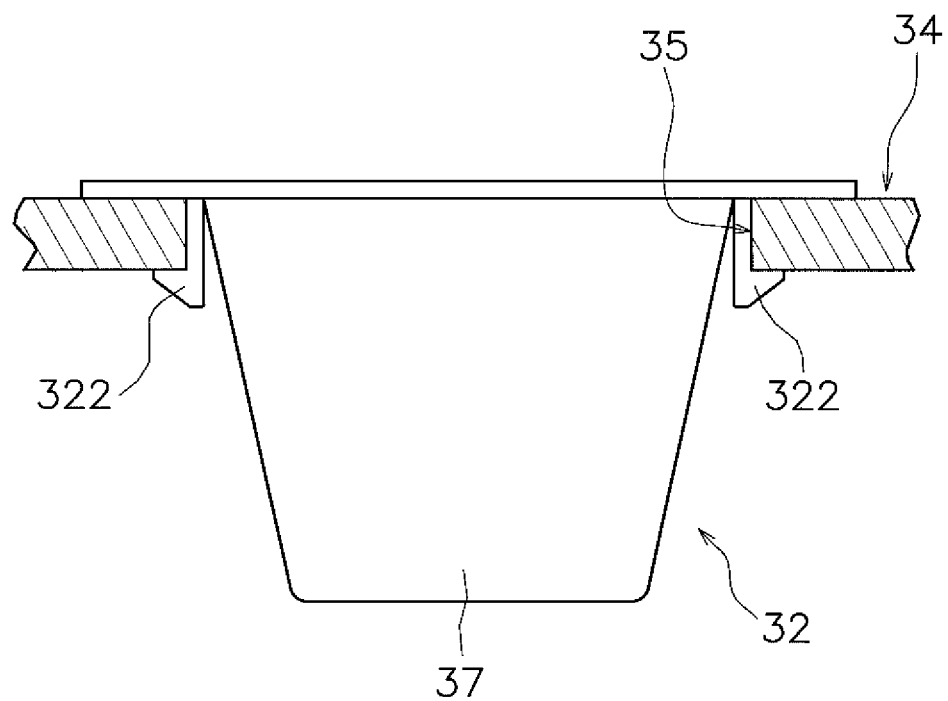
FIG. 12 is a cross sectional view showing a mounting structure of a water protective case according to a first variation of a preferred embodiment of the present invention.

The mounting structure of the water protective case 32 is not limited to the protrusions 321 of the second preferred embodiment. For example, FIG. 12 is a cross sectional view showing a mounting structure of a water protective case 32 according to a first variation of a preferred embodiment of the present invention. As shown in FIG. 12, it is acceptable for the water protective case 32 to include a plurality of lever sections 322. The lever sections 322 are provided in the case main body 37. In FIG. 12, the lid 36 is omitted from the drawing. The lever sections 322 secure the water protective case 32 to the mounting section 34 by catching onto the rim of the opening 35 of the mounting section 34. The lever sections 322 are preferably made of a material having an elastic quality. For example, the lever sections 322 can be made of polypropylene or another resin, for example. In order to remove the water protective case 32 from the mounting section 34, the lever sections 322 are elastically deformed such that the tip end portions of the lever sections 322 move and the lever sections 322 release from the rim of the opening 35. Thus, the water protective case 32 separates from the mounting section 34. It is acceptable for each of the lever sections 322 to include a thin portion such that the lever sections 322 readily undergo elastic deformation.

Figure 13:
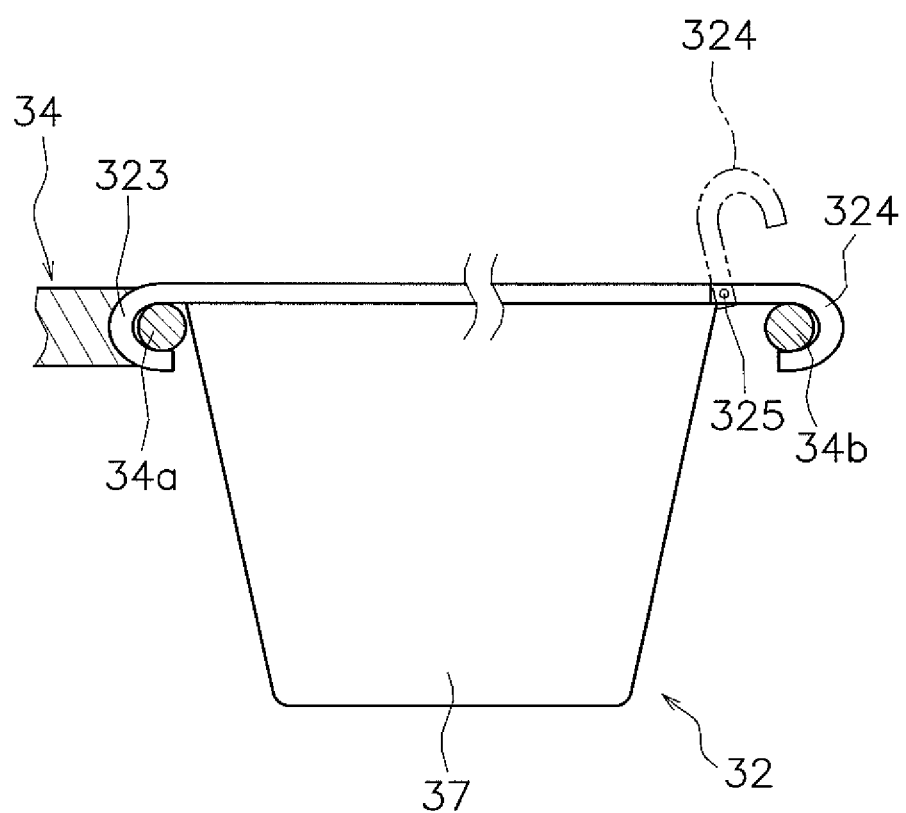
FIG. 13 is a cross sectional view showing a mounting structure of a water protective case according to a second variation of a preferred embodiment of the present invention.

FIG. 13 is a cross sectional view showing a mounting structure of a water protective case 32 according a second variation of a preferred embodiment of the present invention. As shown in FIG. 13, the water protective case 32 includes a stationary hook 323 and a moveable hook 324. The stationary hook 323 and the moveable hook 324 are provided on the case main body 37. In FIG. 13, the lid 36 is omitted from the drawing. The stationary hook 323 is configured to hook onto a shaft 34a of the mounting section 34. The moveable hook 324, too, is configured to hook onto a shaft 34b of the mounting section 34 but the moveable hook 324 can rotate about a rotational axis 325. The water protective case 32 is secured to the mounting section 34 by the stationary hook 323 and the moveable hook 324 being hooked onto the shafts 34a and 34b of the mounting section 34. In order to remove the water protective case 32 from the mounting section 34, the moveable hook 324 is rotated about the rotational axis 325 such that the moveable hook 324 is released from the shaft 34b of the mounting section 34. Thus, the water protective case 32 separates from the mounting section 34.

Figure 14:
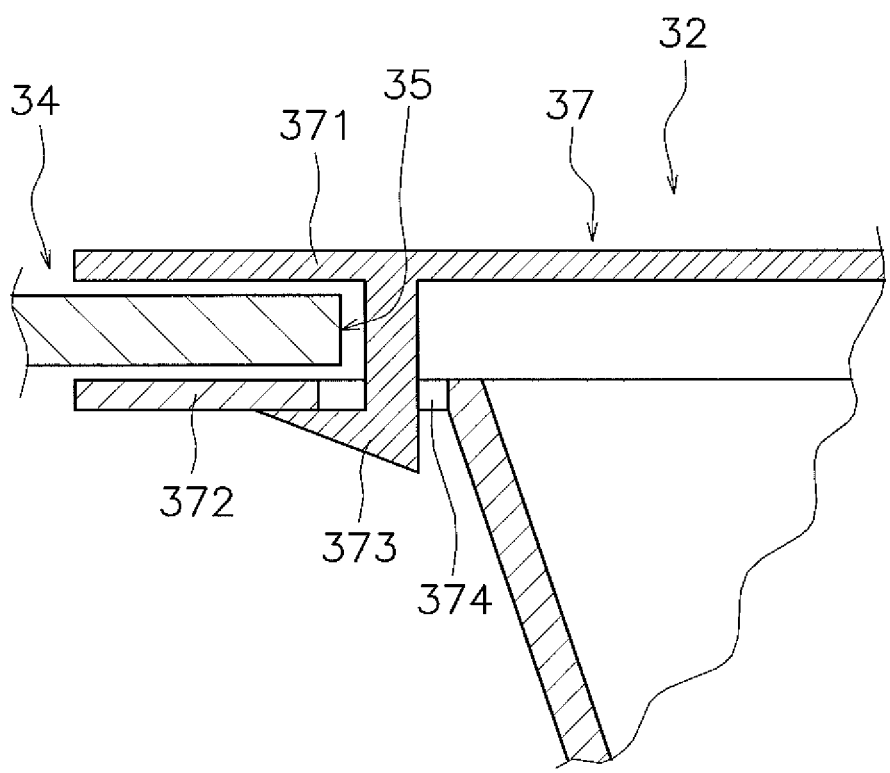
FIG. 14 is a cross sectional view showing a mounting structure of a water protective case according to a third variation of a preferred embodiment of the present invention.

FIG. 14 is a cross sectional view showing a mounting structure of a water protective case 32 according to a third variation of a preferred embodiment of the present invention. As shown in FIG. 14, the case main body 37 includes a first case member 371 and a second case member 372. The first case member 371 is arranged above the second case member 372. The first case member 371 includes a lever member 373. The second case member 372 includes a hole 374. In order to mount the water protective case 32 on the mounting section 34, the second case member 372 is arranged below the rim of the opening 35 of the mounting section 34. The first case member 371 is then arranged above the rim of the opening 35 of the mounting section 34. The lever member 373 is inserted through the hole 374 of the second case member 372 such that the first case member 371 is secured to the second case member 372. In this way, the rim of the opening 35 of the mounting section 34 is pinched between the first case member 371 and the second case member 372 and the water protective case 32 is secured to the mounting section 34. The lever member 373 is preferably made of a material having an elastic quality. For example, the lever member 373 can be made of polypropylene or another resin, for example. In order to remove the water protective case 32 from the mounting section 34, the lever member 373 is elastically deformed such that a tip end portion of the lever member 373 moves and the lever member 373 releases from the rim of the hole 374 of the second case member 372. Thus, the water protective case 32 separates from the mounting section 34. It is acceptable that the lever member 373 includes a thin portion such that the lever member 373 readily undergoes elastic deformation.

Figure 15:
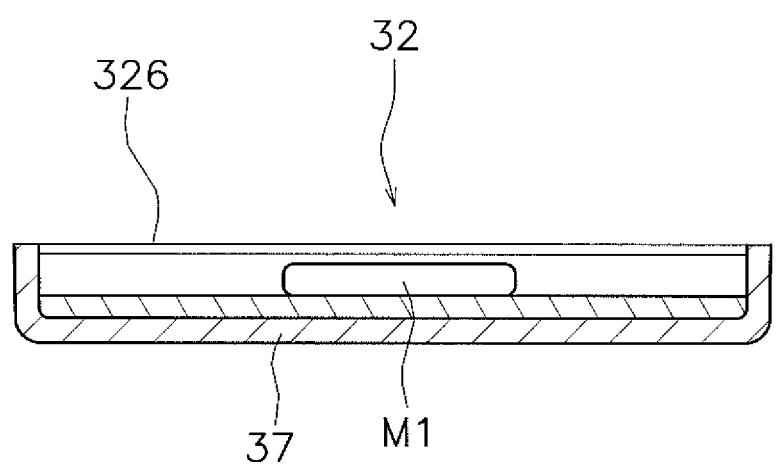
FIG. 15 is a cross sectional view showing a water protective case according to a fourth variation of a preferred embodiment of the present invention.

FIG. 15 is a cross sectional view of a water protective case 32 according to a fourth variation of a preferred embodiment of the present invention. This water protective case 32 includes a transparent window section 326. The window section 326 is made of, for example, a transparent resin. The window section 326 is provided on an upper surface of the case main body 32. A crewperson of the watercraft 200 can check the screen of the mobile terminal M1 through the window section 326.

Figure 16:
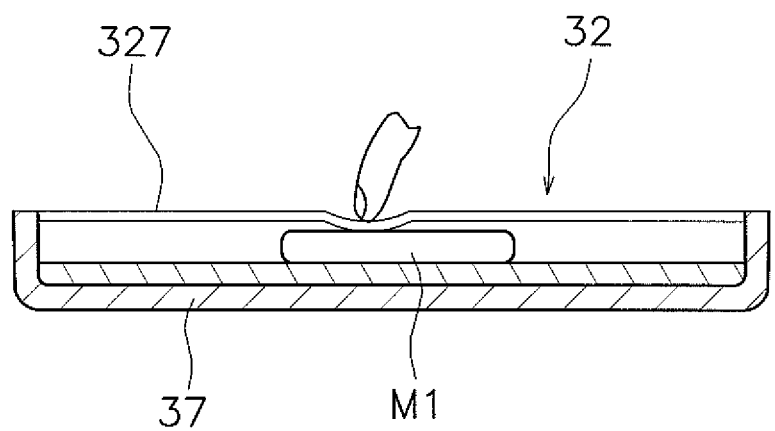
FIG. 16 is a cross sectional view showing a water protective case according to a fifth variation of a preferred embodiment of the present invention.

FIG. 16 is a cross sectional view of a water protective case 32 according to a fifth variation of a preferred embodiment of the present invention. The water protective case 32 includes a transparent window section 327 similar to the water protective case 32 according to the fourth variation. The window section 327 is configured such that a mobile terminal M1 inside the water protective case 32 can be operated through the window 326 from outside the water protective case 32. More specifically, the window section 326 is preferably made of a pliable material that a crewperson can deform by pressing with a finger. In order to operate a mobile terminal M1 having a touch panel function, it is preferable for the window section 326 to be electrically conductive.

Figure 17:
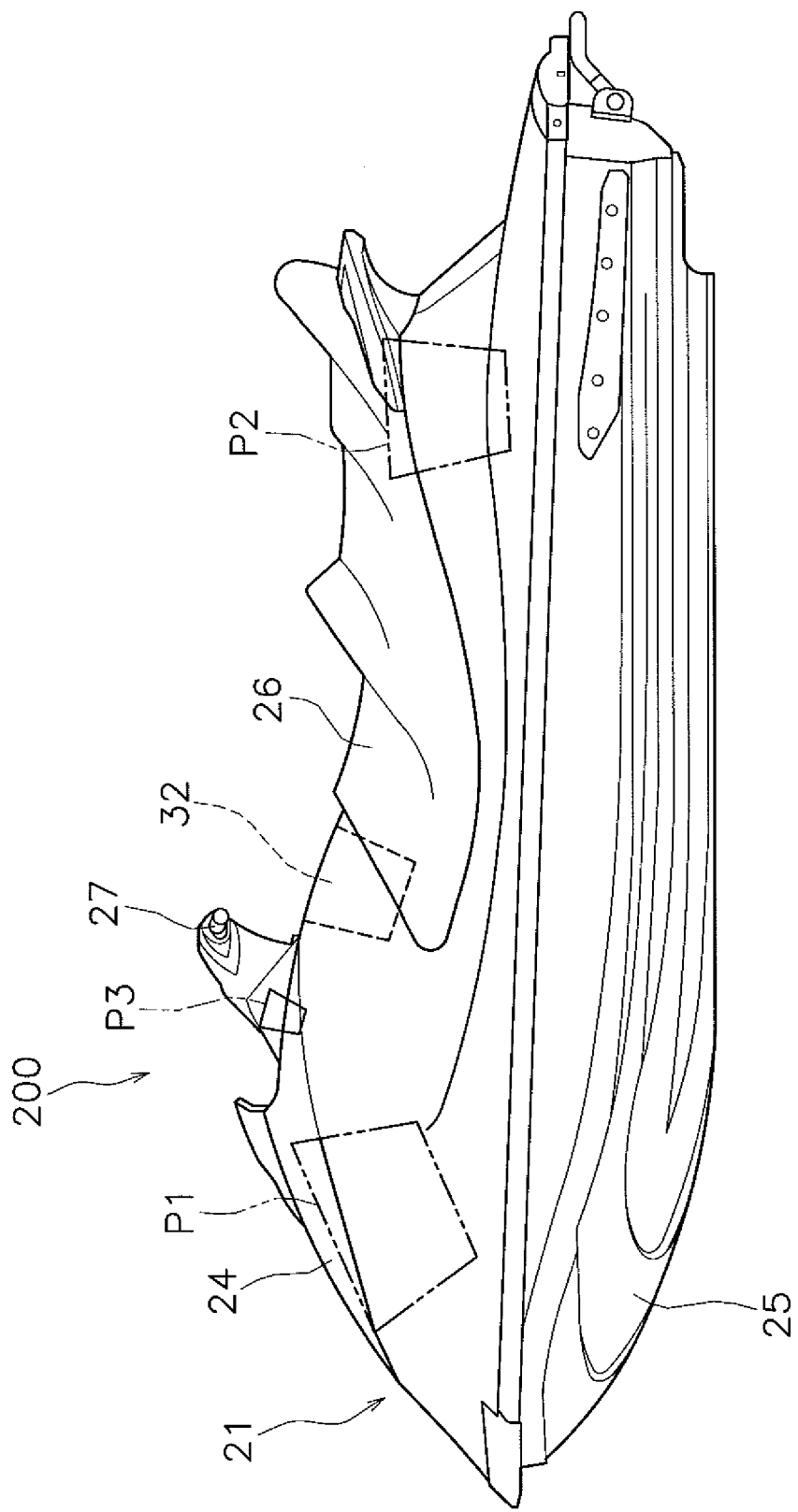
FIG. 17 is a side view of a watercraft illustrating another arrangement of a protective case.

In the second preferred embodiment, the water protective case 32 is preferably arranged between the seat 26 and the steering handlebar 27. However, the water protective case 32 is not limited to being arranged between the seat 26 and the steering handlebar 27 and it is acceptable to arrange the protective case 32 in another position. For example, FIG. 17 is a side view of a watercraft 200 showing another example of how the water protective case 32 might be arranged. As shown in FIG. 17, it is acceptable for the water protective case 32 to be arranged in a position P1 frontward of the steering handlebar 27. It is also acceptable for the water protective case 32 to be arranged in a position P2 below the seat 26. It is also acceptable for the water protective case 32 to be arranged in a position P3 alongside the steering handlebar 27. The position between the seat 26 and the steering handlebar 27 and the positions P1 to P3 are positions where storage compartments are conveniently located and the space of such a storage compartment can be used as a space for arranging the water protective case 32.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A watercraft comprising:
  a watercraft body;
  a watercraft propulsion device configured to propel the watercraft body;
  a water protective case arranged on the watercraft body;

a communication device that communicates with a mobile terminal arranged inside the water protective case; and a display device that displays a content of the mobile terminal based on data received from the mobile terminal through the communication device; wherein the water protective case includes a transparent window section; and the transparent window section is configured such that the mobile terminal inside the water protective case is operated by touching the transparent window section from outside the water protective case.

2. The watercraft according to claim 1, wherein the content of the mobile terminal includes a screen of an application opened on the mobile terminal.

3. The watercraft according to claim 1, wherein the transparent window section defines a touch panel.

4. The watercraft according to claim 3, wherein the communication device is programmed to transmit a signal indicating a touch operation of the touch panel to the mobile terminal such that the mobile terminal is operated according to the touch operation.

5. The watercraft according to claim 1, wherein the content of the mobile terminal includes a reception of a telephone call.

6. The watercraft according to claim 1, wherein the content of the mobile terminal includes position information of the mobile terminal obtained from a global navigation satellite system.

7. The watercraft according to claim 1, further comprising:
a plurality of devices arranged on the watercraft body; wherein the communication device connects the mobile terminal inside the water protective case to an onboard network that is connected to the plurality of devices.

8. The watercraft according to claim 1, wherein the communication device includes a wireless communication antenna that is arranged to communicate with the mobile terminal inside the water protective case.

9. The watercraft according to claim 1, wherein the watercraft body includes a mounting section onto which the water protective case is detachably mounted.

10. The watercraft according to claim 9, wherein the watercraft includes a deck where the mounting section is arranged.

11. The watercraft according to claim 10, wherein the deck includes an opening in which the water protective case is arranged.

12. The watercraft according to claim 10, further comprising:
a steering handlebar arranged on the deck; and
a seat arranged rearward of the steering handlebar.

13. The watercraft according to claim 12, wherein the mounting section is arranged between the steering handlebar and the seat.

14. The watercraft according to claim 9, wherein the water protective case is arranged to be mounted to and removed from the mounting section without using a tool.

15. The watercraft according to claim 1, further comprising:
a battery arranged on the watercraft body; and
a charging device that is connected to the battery and charges the mobile terminal inside the water protective case using a wireless electric power transmission.

* * * * *